United States Patent
Yamamoto et al.

(10) Patent No.: US 9,487,715 B2
(45) Date of Patent: Nov. 8, 2016

(54) COAL GASIFIER

(71) Applicant: MITSUBISHI HITACHI POWER SYSTEMS, LTD., Kanagawa (JP)

(72) Inventors: Takashi Yamamoto, Nagasaki (JP); Katsuhiko Yokohama, Nagasaki (JP); Yoshinori Koyama, Nagasaki (JP); Katsuhiro Ota, Tokyo (JP); Hiromi Ishii, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/610,826

(22) Filed: Jan. 30, 2015

(65) Prior Publication Data

US 2015/0144843 A1    May 28, 2015

Related U.S. Application Data

(62) Division of application No. 13/002,109, filed as application No. PCT/JP2009/062589 on Jul. 10, 2009, now abandoned.

(30) Foreign Application Priority Data

Oct. 22, 2008  (JP) .................................. 2008-271617

(51) Int. Cl.
    *C10J 3/02*       (2006.01)
    *C10K 1/04*       (2006.01)
    *C10J 3/48*       (2006.01)

(52) U.S. Cl.
CPC *C10J 3/02* (2013.01); *C10J 3/485* (2013.01); *C10K 1/04* (2013.01); *C10J 2300/093* (2013.01); *C10J 2300/0956* (2013.01); *C10J 2300/0959* (2013.01); *C10J 2300/0973* (2013.01); *C10J 2300/0976* (2013.01); *C10J 2300/1838* (2013.01); *C10J 2300/1853* (2013.01);
(Continued)

(58) Field of Classification Search
CPC ........................... C10J 3/00; C10J 2300/1861
See application file for complete search history.

(56) References Cited

U.S. PATENT DOCUMENTS 3,864,100 A     2/1975    Blaskowski
3,988,123 A    10/1976    Coates
(Continued)

FOREIGN PATENT DOCUMENTS

CA           1118600 A1    2/1982
JP            6-136371 A    5/1994
(Continued)

OTHER PUBLICATIONS

Notice of Acceptance mailed May 26, 2015, corresponding to Australian patent application No. 2009307613.
(Continued)

*Primary Examiner* — Matthew Merkling
(74) *Attorney, Agent, or Firm* — Kanesaka Berner and Partners LLP

(57) ABSTRACT

Provided is a coal gasifier enabling a reduction in size of a shift reactor by generating hydrogen-rich gasified coal gas. In a coal gasifier (G) generating gasified coal gas by a gasification reaction proceeding in a furnace fed with a gasifiable raw material, such as coal, and a gasifying agent, at least one of water and steam is fed to the furnace as a material accelerating a hydrogen-generating reaction that proceeds simultaneously with the gasification reaction.

2 Claims, 5 Drawing Sheets

(52) U.S. Cl.
CPC . *C10J2300/1884* (2013.01); *C10J 2300/1892* (2013.01); *Y02E 20/18* (2013.01)

(56) References Cited

U.S. PATENT DOCUMENTS

| | | | |
|---|---|---|---|
| 4,158,552 A | | 6/1979 | Blaskowski et al. |
| 4,168,956 A | | 9/1979 | Blaskowski |
| 4,343,627 A | * | 8/1982 | Tanca .......................... C10J 3/54 48/202 |
| 4,531,949 A | * | 7/1985 | Koyama .................. C10J 3/466 252/373 |
| 4,872,886 A | | 10/1989 | Henley et al. |

FOREIGN PATENT DOCUMENTS

| | | |
|---|---|---|
| JP | 6-330058 A | 11/1994 |
| JP | 7-65484 B2 | 7/1995 |
| JP | 8-92573 A | 4/1996 |
| JP | 11302666 A | 11/1999 |
| JP | 2002194363 A | 7/2002 |
| JP | 2005-171148 A | 6/2005 |
| JP | 2008-150463 A | 7/2008 |
| KR | 20000015802 A | 3/2000 |
| WO | 2007123776 A2 | 11/2007 |
| WO | 2007125046 A1 | 11/2007 |

OTHER PUBLICATIONS

Decision to Grant a Patent issued Jun. 26, 2014, corresponds to Chinese Patent Application No. 200980127255.1.
Office Action issued Oct. 9, 2013, corresponds to European Patent Application No. 09821859.7.
Notice of Allowance issued Oct. 24, 2013, corresponds to Indonesian Patent Application No. W000201100162.
Canadian Notice of Allowance issued in Application No. 2,730,323, on Jul. 29, 2013.
Korean Notice of Allowance issued in Application No. 2011-7000412, on Jul. 30, 2013.
Korean Office Action—Korean Language Version dated Jun. 29, 2012.
Korean Office Action—English Language Version cited Jun. 29, 2012.
Canadian Office Action issued May 9, 2012, for Canadian Patent Application No. 2730323, corresponding to U.S. Appl. No. 13/022,109.
International Search Report of corresponding application No. PCT/JP2009/062589 mailed Sep. 29, 2009.
Notice of Allowance issued Oct. 24, 2013, corresponds to Indonesian Patent Application No. W00201100162.

* cited by examiner

EXPERIMENTAL DATA
(COMPARISON OF CASES WITH/WITHOUT FEEDING
OF STEAM TO COMBUSTION CHAMBER)

| Items | | WITHOUT STEAM (S/C=0.00) | WITH STEAM (S/C=0.20) |
|---|---|---|---|
| CO | vol%-dry | 51 | 42 |
| $H_2$ | vol%-dry | 16 | 22 |

COAL GASIFIER

RELATED APPLICATIONS

The present application is a divisional of U.S. patent application Ser. No. 13/002,109, filed Dec. 30, 2010, which is a National Phase of International Application Number PCT/JP2009/062589, filed Jul. 10, 2009, which claims priority to Japanese Application Number 2008-271617, filed Oct. 22, 2008, the disclosures of which are hereby incorporated by reference herein in their entirety.

TECHNICAL FIELD

The present indention relates to a coal gasifier applied to, for example, an integrated coal gasification combined cycle gasifier or a coal gasifier for chemical uses.

BACKGROUND ART

Conventionally, in integrated coal gasification combined cycle (IGCC) plants, as an efficient gasifier, an air-blown integrated coal gasification combined cycle gasifier in which fuel gas for a gas turbine is generated from coal (hereinafter, referred to as gasifier for power generation) has been developed.

On the other hand, in gasifiers for chemical uses, unlike known gasifiers for power generation, which place value on calories of syngas, it is necessary to adapt the composition ($CO/H_2$ ratio) of syngas to that of an intended product (compound). Therefore, gasifiers for chemical uses need a shift reactor for adjusting the $CO/H_2$ ratio.

Similarly, also in gasifiers for power generation, in order to redone the amount of carbon dioxide to be discharged into the atmosphere, equipment for recovering carbon dioxide ($CO_2$) may be combined with the furnaces. In such a gasifier for power generation, a shift reactor is provided to increase the concentration of carbon dioxide in syngas for improving the recovery rate of carbon dioxide.

In the conventional integrated coal gasification combined cycle plant, the coal gas generated by the coal gasifier is cooled by heat exchangers. In this case, no wafer or steam for cooling the generated coal gas is fed (for example, see Patent Literature 1).

Furthermore, in some conventional coal gasification systems, water is fed from the outlet of a gasifier mainly in order to cool the gasified gas (for example, see Patent Literature 2).

CITATION LIST

Patent Literature

{PTL 1} Japanese Examined Patent Application, Publication No. Hei 7-65484
{PTL 2} PCT International Publication No. WO 2007/125046

SUMMARY OF INVENTION

Technical Problem

As described above, in coal gasifiers such as gasifiers for chemical uses and carbon-dioxide-recovery power-generation gasifiers, it is necessary to adjust the composition of syngas (to increase $H_2$ concentration) using a shift reactor. Therefore, the shift reactor can be reduced in volume by increasing the hydrogen ($H_2$) concentration at the outlet of the coal gasifier as much as possible.

The outlet gas of the coal gasifier has a high temperature of 1000° C. or more. Accordingly, when gas is purified for to be used as a chemical raw material or fuel gas, cooling by a heat exchanger or quenching feeding is necessary. As the quenching medium for the quenching feeding, water or gas (such as the syngas or inert gas) is used.

However, though water quenching using water as the quenching medium is the simplest method, it decreases the temperature inside the furnace, resulting in a reduction in thermal efficiency of the plant. Furthermore, if the water fed for quenching is not completely evaporated, treatment of water mixed with unburnt components (soot water, black water) is necessary.

Under such circumstances, in the coal gasifiers such as the gasifier for chemical uses and the carbon-dioxide-recovery power-generation gasifier, it is desirable to make it possible to reduce the size of the shift reactor by hydrogen-enriching the gasified coal gas generated in the coal gasifier.

In the second-stage cooling for cooling high-temperature gasified coal gas generated in the coal gasifier, in particular, in the case of a gasifier for power generation, it is desirable to make it possible to use a heat exchanger with a high efficiency by solving the problem of black-water treatment.

The present invention has been made in view of the above circumstances, and an object thereof is to provide a coal gasifier allowing a reduction in size of the shift reactor by generating hydrogen-rich gasified coal gas.

Solution to Problem

The present invention employs the following solutions for solving the above-mentioned problems.

The coal gasifier according to an aspect of the present invention is a coal gasifier generating gasified coal gas by a gasification reaction that proceeds in a furnace fed with a gasifiable raw material, such as coal, and a gasifying agent, wherein at least one of water and steam is fed to the furnace as a material accelerating a hydrogen-generating reaction proceeding simultaneously together with the gasification reaction.

According to such a coal gasifier, since at least one of water and steam is fed to the furnace as a material accelerating a hydrogen-generating reaction proceeding simultaneously together with the gasification reaction, a water gas reaction and/or a shift reaction rapidly proceeds to generate hydrogen. As a result, the gasified coal gas generated by the gasification reaction is hydrogen-rich gas having a high hydrogen component ratio ($H_2$ ratio).

In the above-mentioned coal gasifier, the coal gasifier is a two-stage entrained-bed gasifier having a combustion chamber and a reduction chamber, wherein the combustion chamber is preferably fed with the steam together with the gasifiable material and the gasifying agent, and the reduction chamber is preferably fed with the gasifiable material only.

In such a two-stage entrained-bed gasifier, since steam is fed to the combustion chamber together with the gasifiable material and the gasifying agent, a water gas reaction and a shift reaction proceed in the combustion chamber, and in the reduction chamber to which only the gasifiable material is fed, a gasification reaction and a water reaction, which are endothermic reactions, proceed. As a result, the water gas reaction and the shift reaction in the combustion chamber and the water gas reaction in the reduction chamber generate hydrogen, and, thereby, the gasified coal gas generated by the gasification reaction becomes hydrogen-rich gas having a high hydrogen component ratio. In addition, since the gasification reaction and the water gas reaction in the reduction chamber are endothermic reactions, reaction quenching which cools the gasified coal gas is performed as the reactions proceed.

The steam in this case is desirably fed to the combustion chamber in the state where the steam is premixed with a gasifying agent (air or oxygen). By doing so, rapid mixing to a high-temperature portion in the furnace is accelerated, which is effective in making the reaction proceed rapidly.

In the above-described coal gasifier, the coal gasifier is a two-stage entrained-bed gasifier having a combustion chamber and a redaction chamber, and the combustion chamber is preferably fed with the gasifiable material and the gasifying agent, and the redaction chamber is preferably fed with at least one of the water or the steam together with the gasifiable material.

In such a two-stage entrained-bed gasifier, a gasification reaction proceeds in the combustion chamber due to a gasifiable material and a gasifying agent fed therein, and a gasification reaction and an water gas redaction proceed in the redaction chamber to which water and/or steam is fed together with a gasifiable material. As a result, since hydrogen is generated by the water gas reaction in the reduction chamber, the gasified coal gas generated by the gasification reaction has a high hydrogen component ratio, that is, is hydrogen rich. In addition, since the gasification reaction and the water gas reaction in the reduction chamber are endothermic reactions, reaction quenching which cools she gasified coal gas is performed as the reactions proceed.

In the above-described coal gasifier, the amount of the water or the steam to be fed is preferably in the range of 0.1 to 0.8 (mass basis) relative to the amount of the gasifiable raw material to be fed. The amount of steam to be fed in this case is a value that ensures an amount sufficient for the reaction within a range not to decrease the temperature inside the furnace.

In the aspect above, a gas-cooling heat exchanger for cooling the gasified coal gas is preferably provided so as to be connected to the outlet of the coal gasifier and is preferably set so that the amount of carbon (C) remaining in char (unreacted coal) passing through the gas-cooling heat exchanger together with the gasified coal gas is 30% or more. By doing so, the char deposited on the surface of the heat exchanger is prevented from being sintered, which makes it possible to use the heat exchanger with high thermal efficiency.

In the above-mentioned coal gasifier, the steam is preferably introduced from a water cooling wall cooling the periphery of the gasifier and/or a water cooling system flowing in the gas-cooling heat exchanger. By doing so, steam to be fed can be ensured by effectively utilizing existing facilities (steam supply).

In the above-mentioned aspect, the gas-cooling heat exchanger cooling the gasified coal gas is preferably provided to be connected to the outlet of the cool gasifier and is preferably set so that the amount of carbon (C) remaining in char (unreacted coal) passing through the gas-cooling heat exchanger together with the gasified coal gas is 30% or more. By doing so, the char deposited on the surface of the heat exchanger is prevented from being sintered, which makes it possible to use the heat exchanger with high thermal efficiency.

Advantageous Effects of Invention

According to the present invention described above, since the gasified coal gas generated by the coal gasifier is hydrogen-rich gas having a high hydrogen ($H_2$) component fraction, that is, since the concentration of hydrogen in the gasified coal gas at the outlet of the coal gasifier can be increased, in particular, in coal gasifiers such as gasifiers for chemical uses and carbon-dioxide-recovery power-generation gasifiers, which need shift reactors, the shift reactors can be reduced in size.

Furthermore, since the problem of black-water treatment is solved to enable use of a heat exchanger in the second-stage cooling of the gasified coal gas by setting the amount of carbon (C) remaining in char passing through the gas-cooling heat exchanger to 30% or more, in particular, in the carbon-dioxide-recovery power-generation gasifier, the thermal efficiency of the plant can be improved. Furthermore, since gasification can be performed by circulating the dried char in the coal gasifier, the carbon conversion ratio at which gasified coal gas is obtained from a gasifiable raw material such as coal can be also increased.

DESCRIPTION OF EMBODIMENTS

An embodiment of the coal gasifier according to the present invention will be described below based on the drawings.

<First Embodiment>

Figure 1:
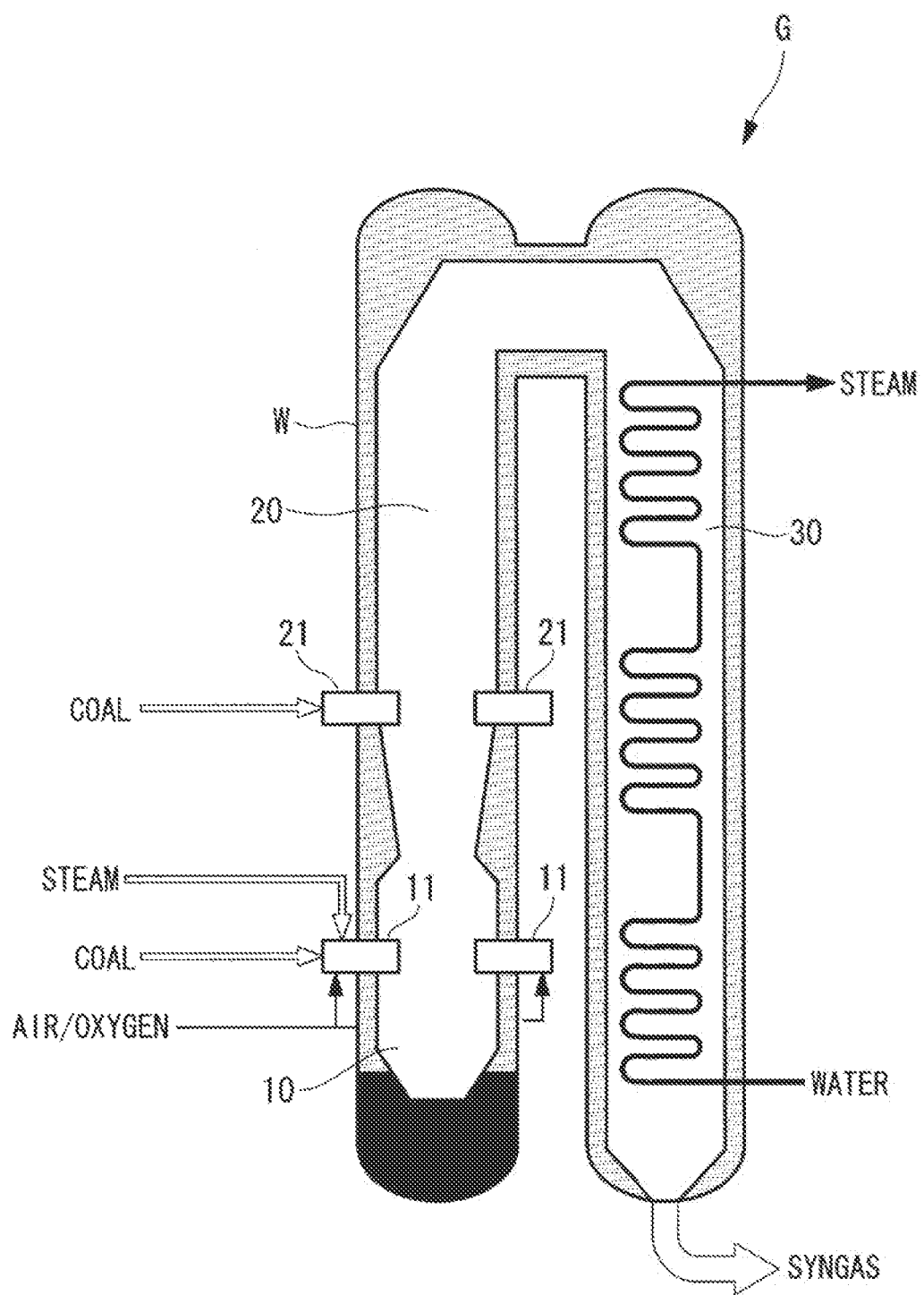
FIG. 1 is a configuration diagram showing a first embodiment of a coal gasifier according to the present invention.

The coal gasifier G shown in FIG. 1 is an apparatus for generating gasified coal gas (hereinafter, referred to as "coal gas") by a gasification reaction proceeding in a furnace to which a gasifiable raw material, such as coal, and a gasifying agent are fed. The coal gasifier G shown in the drawing is a two-stage entrained-bed gasifier having a combustion chamber 10 and a redaction chamber 20, and the reduction chamber 20 is disposed so as communicate with the upper stage (downstream side in the gas flow direction) of the combustion chamber 10. The combustion chamber 10 and the reduction chamber 20 are collectively referred to as "furnace" or "gasifier" in the following description.

Furthermore, the coal gasifier G includes a heat exchanger 30 communicating with the downstream side of the reduction chamber 20 and cooling the coal gas generated in the gasifier.

In the above-mentioned coal gasifier G, the outer peripheral surfaces of the combustion chamber 10, the reduction chamber 20, and the heat exchanger 30 are covered with a water cooling wall W circulating cooling water for cooling.

Thus, the coal gasifier G of the Embodiment is a two-stage entrained-bed gasifier having a combustion chamber 10 and a reduction chamber 20, and the combustion chamber 10 of the lower stage is fed with steam together with a gasifiable material and a gasifying agent, and the reduction chamber 20 of the upper stage is fed with only the gasifiable material.

That is, the combustion chamber (combustor) 10 of the two-stage entrained-bed gasifier is fed with coal (pulverized coal) and char (unreacted coal), described below, serving as gasifiable materials, and air or oxygen, serving as a gasifying agent, from a plurality of burners 11 disposed at appropriate positions. Furthermore, in this Embodiment, steam for promoting a rapid reaction is fed to the combustion chamber 10 from the burners 11.

The steam fed here is desirably premixed with air or oxygen serving as the gasifying agent and is then fed to the burners 11. This is because, since steam fed in the premixed state promotes rapid mixing in a high-temperature portion (furnace core temperature: about 1800° C.) in the combustion chamber 10, as a result, the reaction in the combustion chamber 10 proceeds rapidly.

Incidentally, the steam to be fed to the combustion chamber 10 is not limited to that premixed with the gasifying agent described above, and steam alone may be fed.

In the combustion chamber 10, the following water gas reaction and shift reaction proceed rapidly by feeding steam. Therefore, coal gas (CO) generated by the gasification reaction had a high ratio of hydrogen in the gas, that is, is hydrogen-rich, compared with the case where steam is not fed.

water gas reaction: $C \text{ (solid)} + H_2O \rightarrow H_2 + CO$ 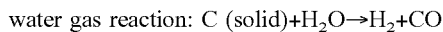

Shift reaction: $CO + O_2 \rightarrow H_2 + CO_2$ 

Gasification reaction: $C \text{ (solid)} + CO_2 \rightarrow 2CO$ 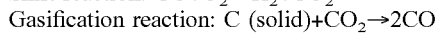

Figure 7:
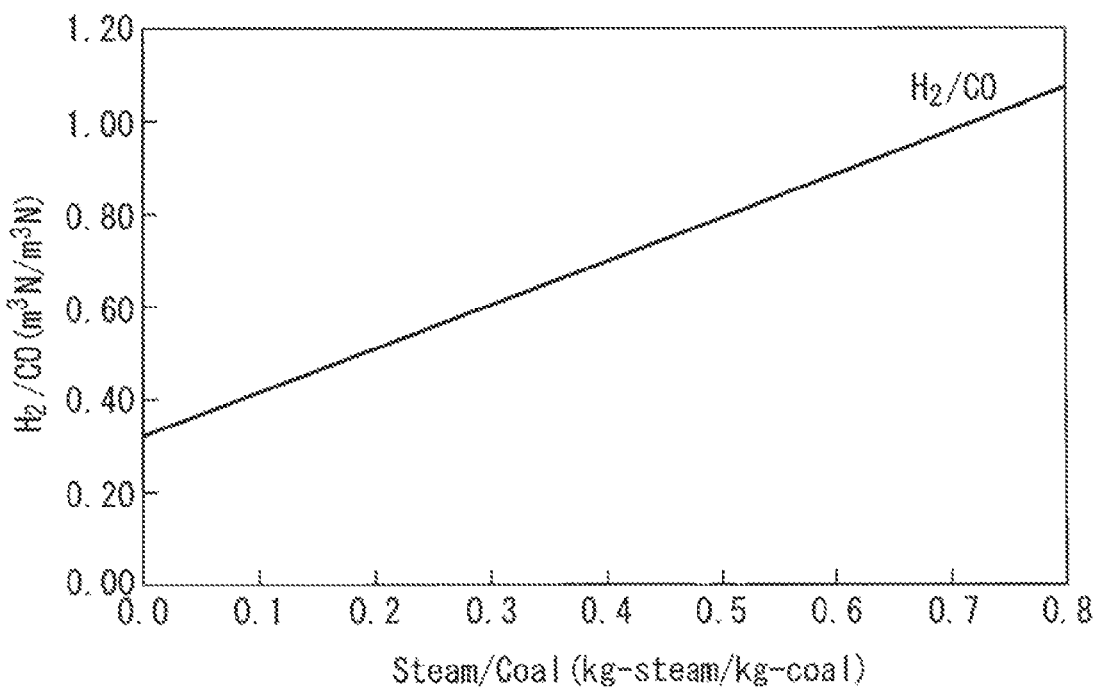
FIG. 7 is a graph showing that the hydrogen ratio is increased by feeding steam.

An appropriate amount of steam to be fed to the combustion chamber 10 is about 0.1 to 0.8, on a mass basis, relative to the flow rate of pulverized coal to be fed as the gasifiable material, since, for example, as shown in FIG. 7, the hydrogen ratio ($H_2$/CO) in coal gas (CO) is increased with the amount of steam to be fed. An increase in the amount of steam to be fed decreases the temperature of the combustion chamber 10 and deteriorates combustion properties ant slug-discharging properties. A simulation was performed to confirm that the coal gasifier 10 can be operated without causing any trouble by regulating the upper limit of the amount of steam to be fed to about 0.8 (mass basis). The appropriate amount of steam to be fed to the combustion chamber 10 is based on the simulation result. That is, the amount of steam to be fed is desirably optimized by considering the trade-off between ensuring a sufficient amount of steam to be fed for accelerating the reaction, and inhibiting a decrease in temperature inside the combustion chamber 10.

Incidentally, in apparatuses with low heat loss, such as those for commercial use, since the amount of steam to be fed can be increased, hydrogen-rich gas can be generated by increasing the ratio of hydrogen in the coal gas.

In the reduction chamber (reductor) 20, only coal (pulverized coal) serving as a gasifiable material is fed from the burners 21. As a result, in the reduction chamber 20, the above-mentioned gasification reaction and water gas reaction proceed due to products such as coal gas, hydrogen and carbon dioxide flowing in from the combustion chamber 10, and the coal additionally fed. Since both these reactions are endothermic reactions, reaction quenching which cools the syngases (gasified coal gas) containing coal gas and hydrogen as main components is performed as the reactions proceed.

The syngas generated in the reduction chamber 20 is subjected to second-stage gas cooling by a heat exchanger 30 connected to the outlet of the gasifier (outlet of the reduction chamber 20). Since this heat exchanger 30 is configured so as to perform heat exchange between the high-temperature syngas and water, the heat-absorbed syngas is decreased in temperature and flows out to the next step, and the heat-absorbing water is increased in temperature and is converted into steam.

In this heat exchanger 30, char (unreacted coal) flowing in together with the syngas deposits, which may cause trouble due to sintering of the char. However, the char can be prevented from being sintered by controlling the amount of C remaining in the char to 30% or more. Note that the value of 30% or more as an amount of remaining C in this case is a finding obtained based on experiments, etc.

In addition, since the fed steam is completely vaporized by maintaining a high temperature inside the furnace, the problem of treating, for example, soot water and black water in which char is mixed is also solved. Therefore, it becomes possible to use a heat exchanger with a high heat exchange efficiency for the second stage cooling of the coal gas. The cooling of the syngas by such a heat exchanger 30 is effective in improving the thermal efficiency of the plant, in particular, for example, in the carbon-dioxide-recovery power-generation gasifier.

The above-mentioned char is recovered by a char-recovering device (for example, a cyclone or high-temperature filler, not shown) disposed on the downstream side of the heat exchanger 30 and is then re-fed to the combustion chamber 10 as a gasifiable raw material. In this case, since the problem of black water etc. is solved, the char is recovered in a dried state. Therefore, gasification can be performed by circulating the dried char in the coal gasifier G, which is also effective for improving the carbon conversion ratio at which coal gas is obtained from a gasifiable material such as coal.

Figures 4, 5:
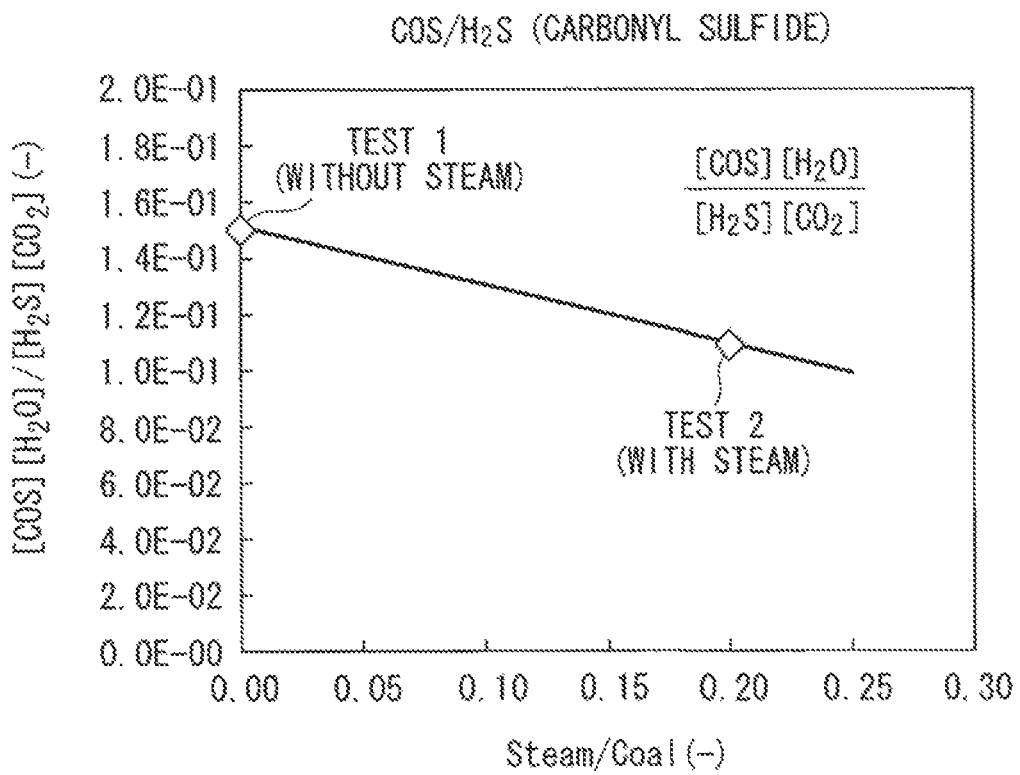
FIG. 4 is experimental data showing that the ratio of hydrogen contained in the gasified coal gas is increased by feeding steam.
FIG. 5 is experimental data showing that carbonyl sulfide (COS) is decreased by feeding steam.

In such a two-stage entrained-bed coal gasifier G, since steam is fed together with the gasifiable material and the gasifying agent to the combustion chamber 10 having a high temperature of about 1800 to 2000° C. as the furnace core temperature, an water gas reaction and a shift reaction proceed in the combustion chamber 10, and a gasification reaction and an water gas reaction, which are endothermic reactions, proceed in the reduction chamber 20 to which only a gasifiable material is fed. As a result, since hydrogen is generated by the water gas reaction and the shift reaction in the combustion chamber 10 and the water gas reaction in the reduction chamber 20, the coal gas generated by the gasification reaction is hydrogen-rich gas having a high hydrogen component fraction. According to the comparative experimental results shown in FIG. 4, it is confirmed that when steam is fed, the ratio of hydrogen in the syngas is 22.1 (vol %-dry), which is higher than the 16.3 (vol %-dry) when steam is not fed.

In addition, since the gasification reaction and the water gas reaction in the reduction chamber 20 are endothermic reactions, reaction quenching which cools the coal gas is performed as the reactions proceed.

That is, since the reactions proceed more rapidly by feeding steam to the high-temperature combustion chamber 10, the efficiency (carbon conversion ratio) of the combustion chamber 10 is improved.

Figure 6:
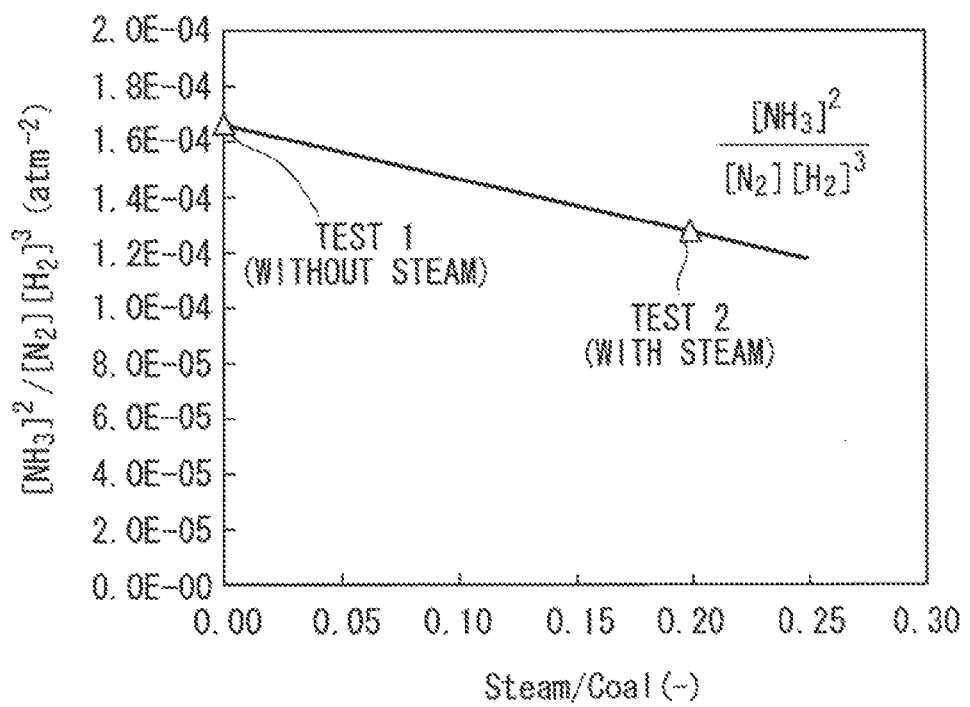
FIG. 6 is experimental data shoving that the amount of generated ammonia ($NH_3$) is reduced by feeding steam.

In addition, the amounts of by-products, such as ammonia and carbonyl sulfide, produced by the coal gasifier G can be restricted by feeding steam to the combustion chamber 10. That is, according to the experimental results shown in FIGS. 5 and 6, it is confirmed by comparing test 1 where steam is not fed and test 2 where steam is fed that the amount of by-products is obviously lower in test 2 where steam is fed.

Note that since the above-mentioned steam is fed into the combustion chamber 10 at a high pressure (about 2.5 to 5 MPa), a high-pressure steam source is necessary. Accordingly, for example, the steam generated by heating the water in wafer cooling systems, that is, the water flowing in the water cooling wall W or the heat exchanger 30, is introduced to the high-pressure steam source, and the pressure is increased to a desired level as regained. That is, though a pressure-raising device for producing high-pressure steam may be necessary in some cases, a sufficient amount of steam for feeding can be obtained by effectively utilizing existing facilities (the water cooling wall W and the heat exchanger 30 of the water cooling system) of the coal gasifier G as the steam supply.

The system where steam is thus-fed to the high-temperature combustion chamber 10 is suitable for a case where common coal is used as raw material coal. That is, when the temperature inside the combustion chamber 10 can be maintained high by using common (good-quality) raw material coal, a large amount of a steam can be fed into the high-temperature combustion chamber 10. In addition, since steam also has an effect as a gasifying agent, the oxygen ratio of air or oxygen (oxygen feeding rate) to be fed as the gasifying agent can be reduced according to the amount of steam to be fed. As a result, the concentrations of active gas components (CO, $H_2$) being used as gas turbine fuel can be increased.

Incidentally, though steam is fed in the above-mentioned embodiment, water may be fed in the form of a spray.

<Second Embodiment>

Figure 2:
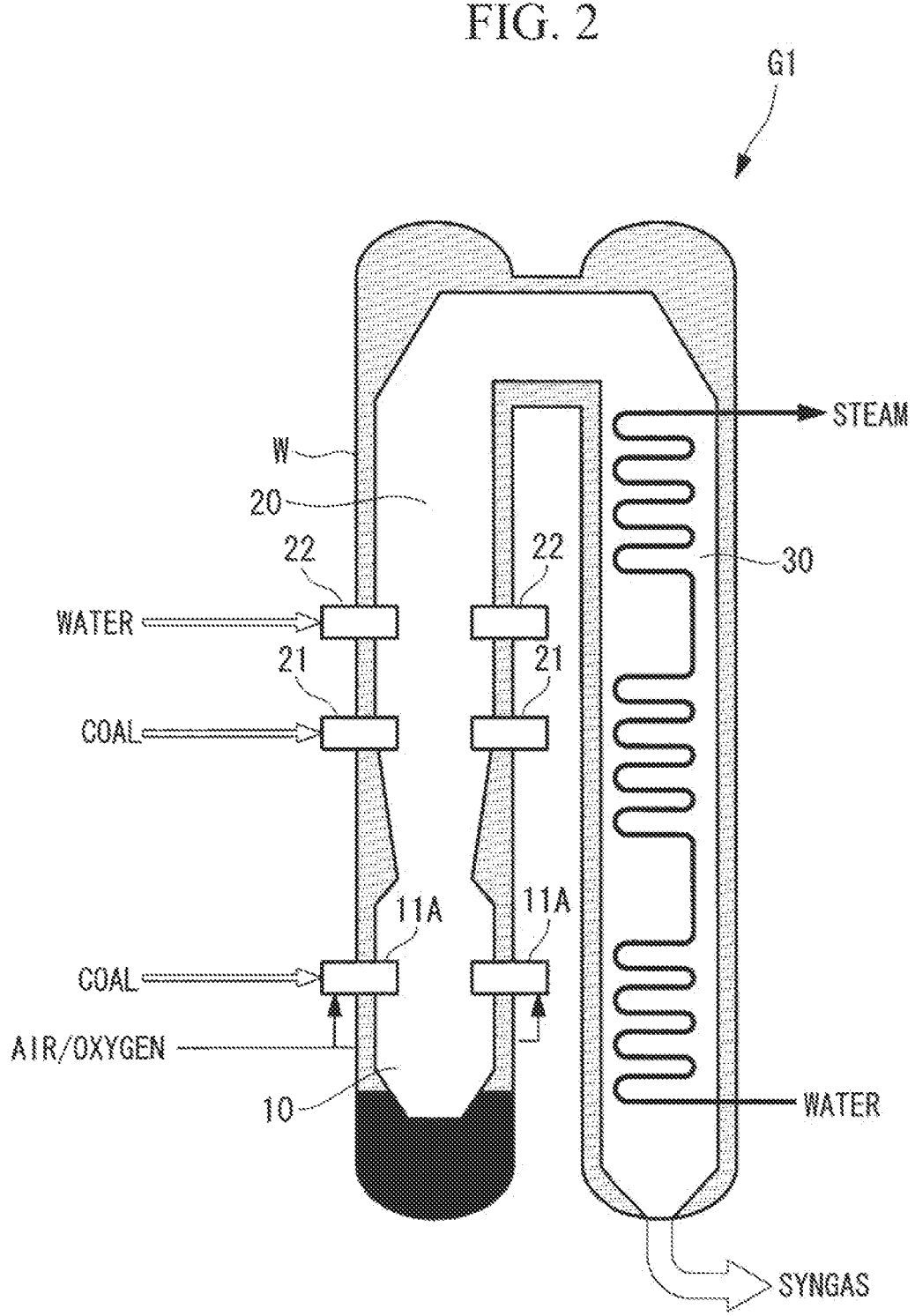
FIG. 2 is a configuration diagram showing a second embodiment of a coal gasifier according to the present invention.

Next, a coal gasifier according to the present invention will be described by showing a second embodiment in FIG. 2. The portions similar to those in the above-described embodiment are designated with the same reference numerals, and detailed descriptions thereof are omitted.

The coal gasifier G1 shown in the drawing is, as in the above-described embodiment, a two-stage entrained-bed gasifier having a combustion chamber 10 and a reduction chamber 20.

In this embodiment, the combustion chamber 10 is fed with coal (pulverized coal) and char serving as gasifiable raw materials from burners 11A together with a gasifying agent (air or oxygen). As a result, a gasification reaction proceeds in the combustion chamber 10 due to the gasifiable materials and the gasifying agent that have been fed.

The reduction chamber 20 is fed with water in a sprayed form from spray nozzles 22 together with coal (pulverized coal) serving as a gasifiable raw material from burners 21. As a result, the above-mentioned gasification reaction and water gas reaction proceed in the redaction chamber 20 due to the coal gas flowing in from the combustion chamber 10 and the pulverized coal and water fed into the redaction chamber 20. Since both these reactions are endothermic reactions, reaction quenching which cools the syngas is performed as the reactions proceed. In this case, an appropriate amount of water to be fed is about 0.1 to 0.8, on a mass basis, relative to the flow rate of pulverized coal to be fed as the gasifiable material, for the same reasons as those in the above-described embodiment.

In the coal gasifier G1 of such a two-stage entrained-bed gasifier, the gasification reaction proceeds due to the gasifiable materials and the gasifying agent fed into the combustion chamber 10. Furthermore, in the redaction chamber 20, the gasification reaction and the water gas reaction proceed by being fed with water in a sprayed form together with the gasifiable material.

As a result, the hydrogen generated by the water gas reaction in the reelection chamber 20 makes the gasified coal gas a hydrogen-rich gas. In addition, since the gasification reaction and the water gas reaction in the reduction chamber 20 are endothermic reactions, reaction quenching which cools the syngas is performed as the reactions proceed.

In the thus-configured coal gasifier G1, since the reduction chamber 20 is fed with water only, the nozzles for feeding water have almost no restriction in design and configuration and have a considerable high degree of freedom. Furthermore, since water in this case is fed as high-pressure water whose pressure can be increased by a pump, a high-pressure steam supply is unnecessary. Furthermore, the feeding of water to the reduction chamber 20 can be expected to exhibit a quenching effect on the inside of the reduction chamber 20.

Furthermore, in the thus-configured coal gasifier G1, since steam is not fed into the combustion chamber 10, it is easy to maintain the inside of the combustion chamber 10 at a high temperature.

Therefore, the coal gasifies G1 feeding water in a sprayed form to the reduction chamber 20 is suitable for the case where the coal (pulverized coal) used as a gasifiable raw material is coal having a high ash melting point (1500° C. or more). That is, when the raw material coal is a coal having a high ash melting point, the temperature inside the combustion chamber 10 can be maintained high by not feeding steam for stably discharging melted ash, and, in the reduction chamber 20, the temperature of the gasified coal having a high gas temperature can be sharply decreased by the quenching effect due to feeding of steam and reaction quenching as the reaction proceeds.

<Third Embodiment>

Figure 3:
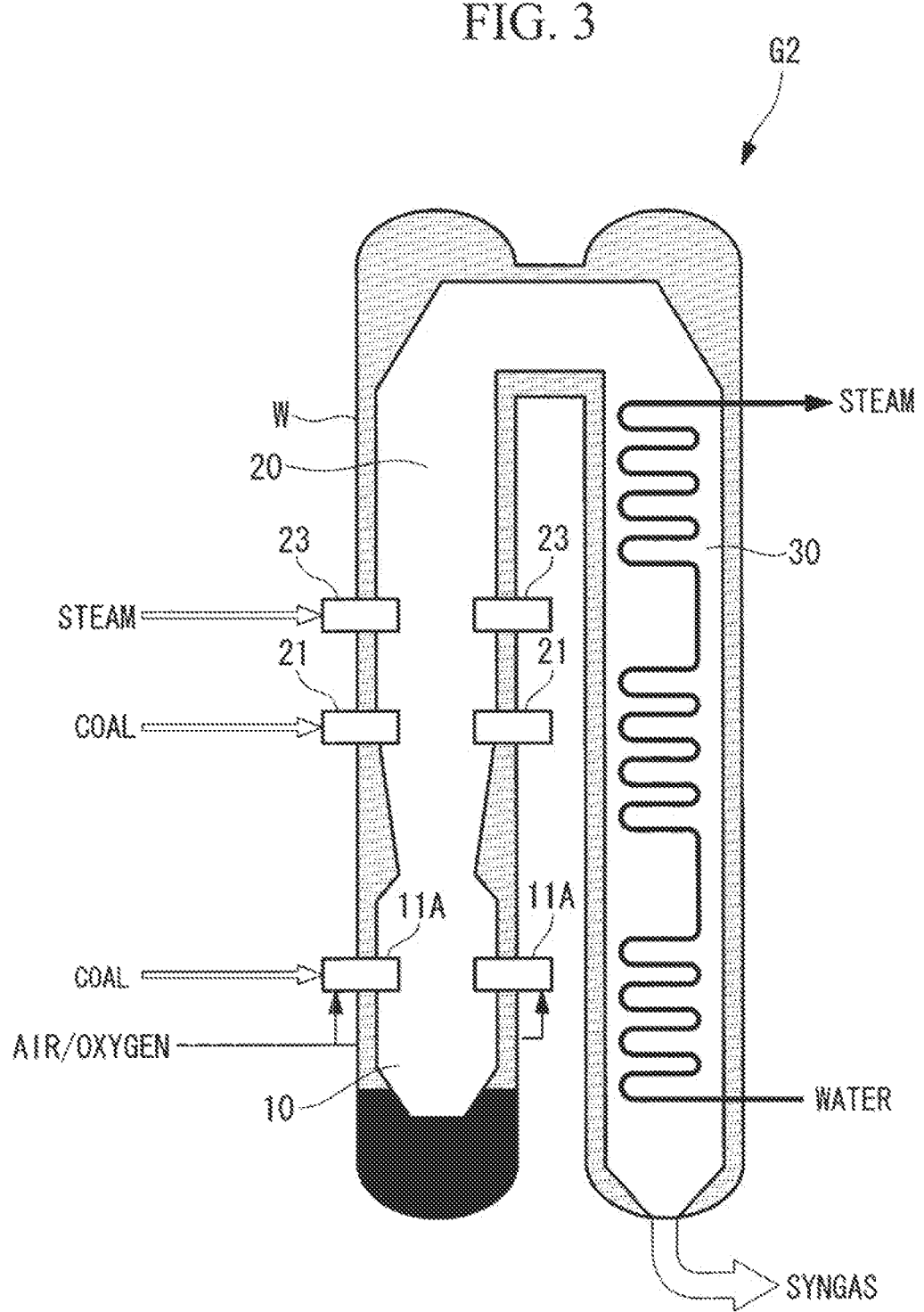
FIG. 3 is a configuration diagram showing a third embodiment of a coal gasifier according to the present invention.

Next, a coal gasifier according to the present invention will be described by showing a third embodiment in FIG. 3. The portions similar to those in the above-described embodiments are designated with the same reference numerals, and detailed descriptions thereof are omitted.

The coal gasifier G2 shown in the drawing is a two-stage entrained-bed gasifier having a combustion chamber 10 and a reduction chamber 20, as in the above-described embodiments.

This embodiment is different in that, instead of feeding water to the reduction chamber 20 in the above-described second embodiment, steam is fed from steam nozzles 23 to the redaction chamber 20 of the coal gasifier G2, which is the two-stage entrained-bed gasifier. Note that remaining configuration of the coal gasifier G2 of thus embodiment is the same as that of the second embodiment.

That is, the reduction chamber 20 of this embodiment is fed with steam together with pulverized coal serving as a gasifiable raw material. In this case, an appropriate amount of steam to be fed is about 0.1 to 0.8, on a mass basis, relative to the flow rate of coal to be fed as pulverized coal to the combustion chamber 10 and the reduction chamber 20, because of the same reasons as those in the above-described embodiments.

In the reduction chamber 20, the gasification reaction and the water gas reaction proceed due to the feeding of steam. These reactions are both endothermic reactions, reaction quenching which cools the syngas is performed as the reactions proceed. In addition, since hydrogen is generated by the water gas reaction, hydrogen-rich coal gas is generated.

In the thus-configured coal gasifier G2, since steam is not fed to the combustion chamber 10, the temperature inside the combustion chamber 10 can be easily maintained high. Therefore, the goal gasifier G2 feeding steam to the reduction chamber 20 is suitable for the case where coal (pulverized coal) having a high ash melting point is used as the gasifiable raw material. That is, when the raw material coal is a coal having a high ash melting point (1500° C. or more), the temperature inside the combustion chamber 10 can be maintained high for stably discharging the melting ash, and, in the reduction chamber 20, the temperature of the high-temperature gasified coal gas can be sharply decreased by the quenching effect due to feeding of steam and reaction quenching as the reaction proceeds.

The embodiment in which steam is fed to the reduction chamber 20 is suitable for she case where coal having a low fuel rate of one or less, such as lignite, is used. This is because feeding of steam to the reduction chamber 20 has a cracking effect that accelerates decomposition of gasified by-products originating from volatile substances contained in the raw material coal.

In addition, since the steam fed to the reduction chamber 20 accelerates the reaction decomposing the volatile substances contained in the raw material coal fed to the reduction chamber 20, generation of by-products, such as carbon hydride, tar (heavy hydrocarbon), and ammonia, originating from coal fed to the reduction chamber is inhibited.

Thus, according to the coal gasifiers G, G1, and G2 of the present invention, since at least one of water and steam is fed into the furnace of the combustion chamber 10 and/or the reduction chamber 20 as a material accelerating a hydrogen-generating reaction that proceeds simultaneously with the gasification reaction, the water gas reaction and/or the shift reaction rapidly proceed to generate hydrogen. As a result, the coal gas generated by the gasification reaction is made a hydrogen-rich gas having a high hydrogen component fraction.

Thus, according to the present invention described above, since the gasified coal gas generated by the coal gasifiers G, G1, or G2 is hydrogen-rich gas having a high hydrogen component fraction, in particular, in coal gasifiers, such as gasifiers for chemical uses and carbon-dioxide-recovery power-generation gasifiers, which need shift reactors, the shift reactors can be reduced in size.

Furthermore, the problem of black water treatment can be solved to enable use of a heat exchanger in the second-stage cooling of the gasified coal gas by setting the amount of carbon (C) remaining in char passing through the gas-cooling heat exchanger 30 to 30% or more: in particular, in the case of a carbon-dioxide-recovery power-generation gasifier, the thermal efficiency of the plant can be improved. Furthermore, since gasification can be performed by circulating the dried char in the coal gasifier G, G1, or G2, the carbon conversion ratio at which gasified coal gas is obtained from a gasifiable raw material such as coal can be also increased.

Note that, in the above-described embodiments, feeding of steam to the combustion chamber 10, feeding of water (water spray) to the reduction chamber 20, and feeding of steam to the redaction chamber 20 are performed alone, but the present invention is not limited thereto, and various combinations sire possible. That is, for example, feeding of steam to the combustion chamber 10 and feeding of water spray to the reduction chamber 20 may be combined and simultaneously performed, or feeding of steam to the combustion chamber 10 and feeding of steam to the reduction chamber 20 may be combined and simultaneously performed. Accordingly, they can be selected according to various conditions.

The present invention is not limited to the above-described embodiments and can be suitably modified within a range that does not depart from the spirit of the present invention.

REFERENCE SIGNS LIST

G, G1, G2 coal gasifier
10 combustion chamber
20 reduction chamber
30 heat exchanger

The invention claimed is:

1. A process of generating gasified coal gas by a gasification reaction using a coal gasifier,
   wherein said coal gasifier is a two-stage entrained-bed gasifier having:
   a furnace comprising a combustion chamber and a reduction chamber,
   a gas-cooling heat exchanger communicating with a downstream side of the reduction chamber, and
   a water cooling wall covering outer peripheral surfaces of the combustion chamber, the reduction chamber, and the gas-cooling heat exchanger,
   wherein said process comprises:
   feeding, from outside of the furnace via a combustion chamber burner into the combustion chamber,
      at least one of water and steam as a material accelerating a hydrogen-generating reaction proceeding together with the gasification reaction the steam being generated from water flowing in the water cooling wall and/or the gas-cooling heat exchanger,
      a gasifiable raw material including coal, and
      a gasifying agent;
   feeding the gasifiable raw material from outside of the furnace via a reduction chamber burner into the reduction chamber, without feeding the gasifying agent, the water, and the steam into the reduction chamber;
   cooling, in the gas-cooling heat exchanger, the gasified coal gas generated in the reduction chamber; and
   controlling an amount of carbon (C) remaining in unreacted coal passing through the gas-cooling heat exchanger together with the gasified coal gas to 30% or more.

2. The process according to claim 1, wherein an amount of the water or steam fed into the combustion chamber is 0.1 to 0.8 on a mass basis relative to an amount of the gasifiable raw material fed into the combustion chamber.

* * * * *